May 17, 1960     J. RING ET AL     2,936,732
PRODUCTION OF OPTICAL FILTERS
Filed July 15, 1955     2 Sheets-Sheet 1
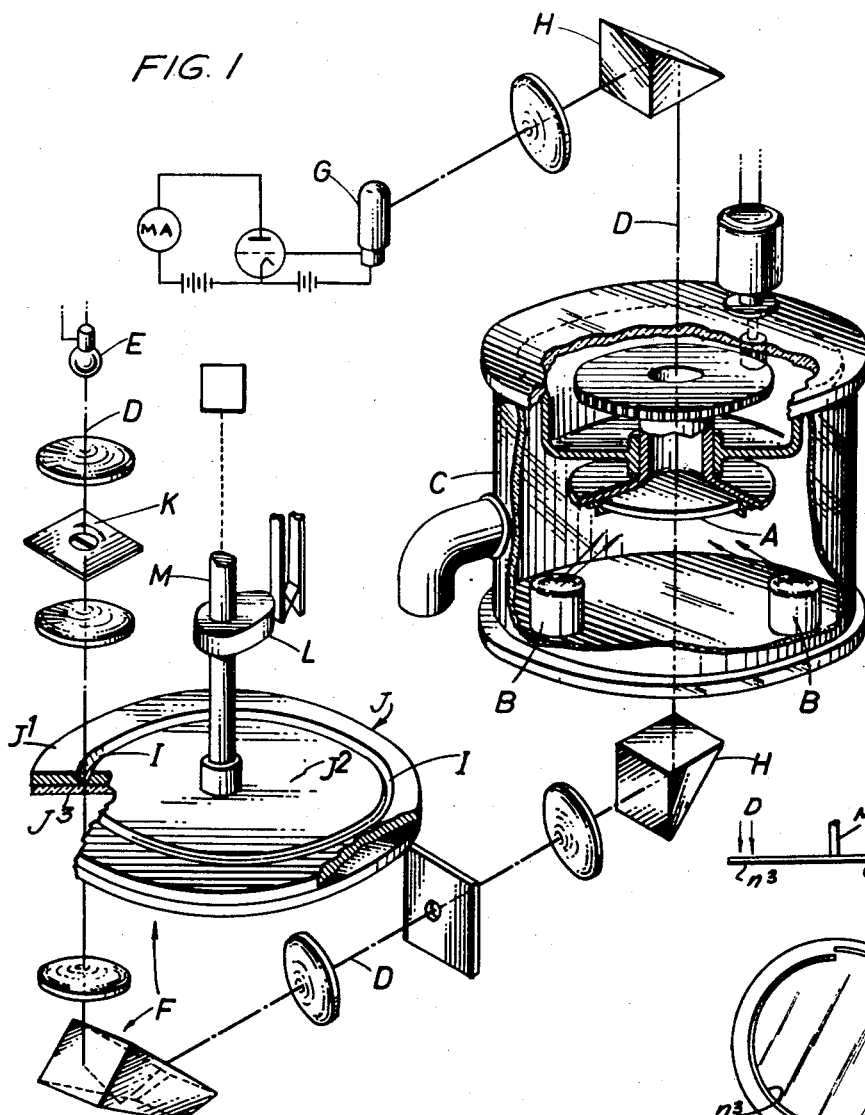
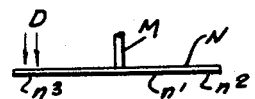
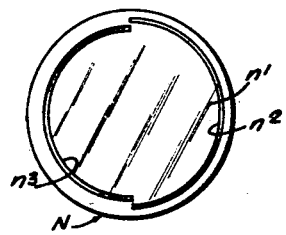
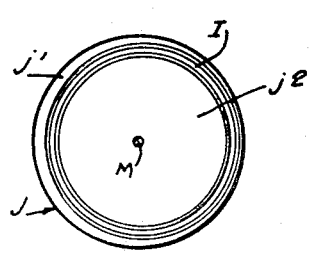
INVENTORS
HENRY JOHN JAMES BRADDICK
JAMES RING
BY
ATTORNEYS May 17, 1960   J. RING ET AL   2,936,732
PRODUCTION OF OPTICAL FILTERS
Filed July 15, 1955   2 Sheets-Sheet 2

INVENTORS
JAMES RING
HENRY J.J. BRADDICK
BY
ATTORNEY

United States Patent Office 2,936,732
Patented May 17, 1960

2,936,732
PRODUCTION OF OPTICAL FILTERS

James Ring and Henry J. J. Braddick, Manchester, England, assignors to National Research Development Corporation, London, England, a British corporation Application July 15, 1955, Serial No. 522,211

6 Claims. (Cl. 118—9)

This invention relates to the production of optical filters, more particularly of the type comprising a central spacing layer lying between reflecting films which themselves consist of alternated layers of different dielectric materials.

The normal practice in producing such filters is to deposit the successive layers of (say) cryolite and zinc sulphide by means of vacuum evaporation, and if the filter is only to pass light of one particular wavelength, the thickness of each layer (and especially that of the spacing layer) requires to be controlled with extreme accuracy.

At normal incidence the wavelength ($\lambda$) of the pass-band is represented by $$2 \frac{\mu}{n} t$$

where ($\mu$) is the refractive index of the spacing layer, $t$ is its thickness, and $n$ is the order of interference. Although the pass-band may be adjusted to shorter wavelengths by tilting the filter, such tilting reduces its efficiency, and for many applications the practical wavelength displacement obtainable in this manner is 50 A. at, say, $\lambda$ 5000.

Thus, for typical all-dielectric filters having a pass-band about 50 A. in width, a random distribution of layer thicknesses corresponding to a standard error of 1%, which could be disregarded in the construction of multi-layer reflecting films, will render about three-quarters of any given batch of interference filters unusable at the designated wavelength.

Visual colour matching having been found insufficiently accurate for the purpose, most known methods of layer-thickness control are based upon photoelectric measurements of reflectivity or transmission.

Observation of reflectivity (using a separate control surface for each layer deposited) has not, however, resulted in an average layer-thickness error of less than 4%, and there are no published claims for reducing the probable error of reproducibility of the pass-band below 2% by measurement of transmission.

The present invention has for its object an improved method of level-thickness control whereby the error above-mentioned is virtually eliminated, and involves adaptation of a known procedure, hitherto only employed for measuring the performance of existing filters and for preparing reflecting films, in which the filter under test is explored by a light-beam having its wavelength continuously modulated over a small range, and correct performance of the filter is indicated by the transmission being stationary at the specified wavelength.

A further object of the present invention is to provide reliable means for carrying the aforesaid improved method into effect.

According to this invention, in the production of an interference filter by successive deposition of dielectric layers, the filter is explored, during actual deposition of each layer, by a light-beam so modulated that the wavelength thereof exhibits regular alternations between opposite extremes of a small range, and deposition is terminated as soon as the transmission, considered as a function of wavelength, has a stationary point at a specified wavelength indicating that the layer thickness is correct for this wavelength.

Such improved method may be carried into effect by passing the light-beam aforesaid through a monochromator whose entrance slit is represented by successive portions of an annular transparent area arranged eccentrically of an otherwise opaque rotating disc which intersects the incident beam, or by two half-annular transparent areas of said disc arranged concentric with its axis but of different radii and diametrically opposed to one another, or again the monochromator may have two entrance slits to which the incident beam is admitted alternately by two rotating half-annular transparent areas corresponding to, but substantially wider than, those just mentioned. If desired, the whole of the monochromator, apart from its entrance slit or slits, may be replaced by a wedge filter in any of the arrangements aforesaid.

In an alternative system, suited to the quantity production of identical filters, the exploring beam is passed through a rotating disc of which opposite halves are interference filters designed to pass suitably different wavelengths, or through a single filter of suitable wavelength which is continuously wobbled with a uniform or intermittent motion.

In the accompanying drawings:

Fig. 1 is a schematic diagram of one arrangement of apparatus for carrying the present invention into effect.

Fig. 2 is a front view of the rotary disc shown in Fig. 1.

Fig. 3 is a side elevation of another form of rotary disc, and

Fig. 4 is a rear view of the same.

Figures 5, 6:
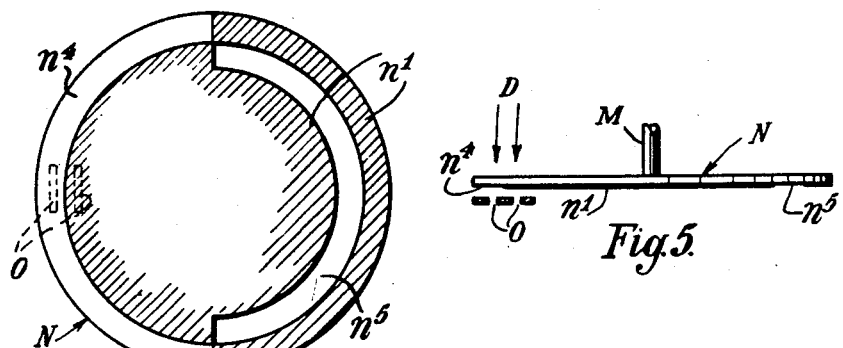

Figs. 5 and 6 correspond respectively to Figs. 3 and 4 but show yet another form of rotary disc.

Figs. 7 and 8 again correspond to Figs. 3 and 4 respectively, but show the rotary disc employed in a further system for carrying out the invention.

Figure 7:
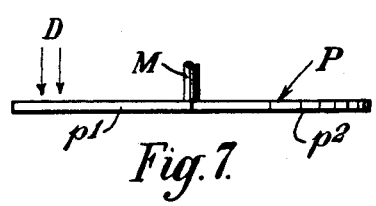
Figure 8:
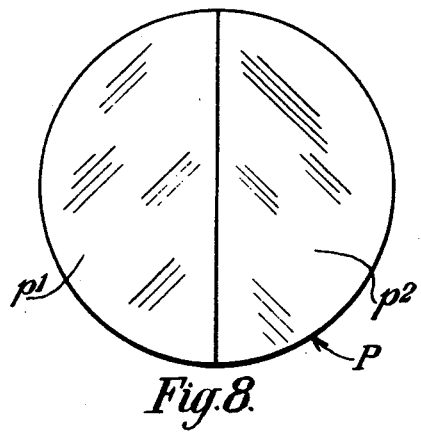
Figure 10:
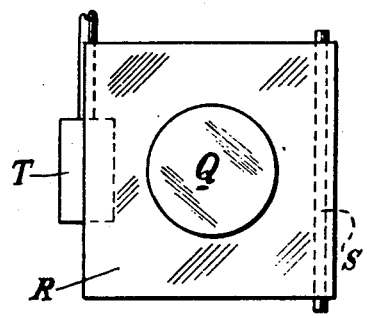
Figure 9:
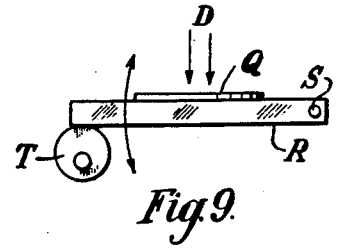
Figure 11:
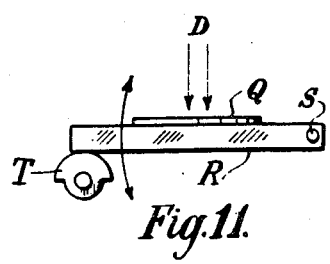

Figs. 9 and 10 are views corresponding respectively to Figs. 7 and 8, but showing an alternative device for modulating the exploring beam, and Fig. 11 is a view corresponding to Fig. 9 but showing a modification thereof.

In the example illustrated in Figs. 1 and 2, the evaporation of the substances (cryolite and zinc sulphide), whose alternate deposition in layers of appropriate thickness is to build up the required filter on a glass plate A, is carried out in electrically-heated crucibles B in a glass-ended vacuum chamber C within which the plate A is slowly rotated.

A beam of light D from a suitable electric lamp E (whose output may be stabilized by accumulators) is directed through a monochromator F and through the glass plate A within the chamber C so as finally to impinge upon a photo-multiplier cell G, right-angled prisms H being arranged where necessary for suitably deflecting the beam D.

The monochromator F, which may be otherwise of known form, has its entrance slit represented by successive portions of a narrow annular transparent area I disposed eccentrically of an otherwise opaque member J which rotates rapidly about an axis parallel to, but spaced from, that of the incident light-beam D so as to intersect the latter at all times. This eccentric annular area may be conveniently be defined by the adjacent edges of a sheet-metal ring $j'$ and disc $j^2$ suitably secured (as by screws) to the front face of a plastic or other transparent disc $j^3$, as shown in Fig. 1.

This endless entrance slit I (which may be, say, 1 mm. wide with an eccentricity of 2 mm.) is illuminated by a wide patch of light to which a wedge shape is imparted by the projected image of an adjustably-inclined knife-edge K in the incident beam D. Rotation of the scanning disc J at about 20 cycles per second causes the effective entrance slit to oscillate at this frequency in the direction of the monochromator prism dispersion, and as the endless slit I moves across the wedge-shaped patch of light its illuminated length varies.

The current from the photo-multiplier cell G is passed through the grid load of an amplifier and a microammeter in series, the A.C. voltage signal being amplified about 1000 times and then synchronously rectified by means of a commutator L on the same shaft M as the scanning disc J, or otherwise.

Any component at the frequency of rotation of the latter produces a D.C. signal which is applied to a chart-recording or indicating instrument through a cathode follower, and may also be depicted by an oscilloscope.

Owing to the spectral variation of the lamp emission, of the monochromator dispersion, and also of the photocathode sensitivity, the overall wavelength response of the system has a maximum at about λ5200, falling to 10% of this value at either end of the visible spectrum.

The above-mentioned variation of the effective slit length due to the adjustable knife-edge K may be made to compensate the change in spectral response of the apparatus in any required region before deposition of the films.

If the overall response curve has a stationary point at the mean wavelength of the slit scan, the amplifier waveform contains no component at the frequency of oscillation, although in general a component at twice this frequency remains. Thus after rectification there is zero D.C. output, the knife-edge K being adjusted to establish this condition before any film is deposited.

During deposition of the first layer, consisting of zinc sulphide or other dielectric of high refractive index, a dip appears in the wavelength-response curve and travels in the direction of increasing wavelength. This results in a component at the frequency of oscillation and a consequent D.C. signal at the recorder which first increases and then decreases to zero as the dip becomes symmetrical at about $\lambda_0$ (the mean wavelength of oscillation), the film thickness being then equal to $$\frac{\lambda_0}{4}$$

This process is repeated for the successive layers.

The amplitude of the D.C. signal is greater during the deposition of a zinc sulphide or equivalent layer than when cryolite or other low-index dielectric is being deposited, and the two signals differ in sign.

During deposition of the first two layers the microammeter, which shows the maxima and minima of transmission, may be used for control purposes, but for subsequent layers much greater accuracy may be obtained by observation of the rectified A.C. signal, the largest signals being obtained for thee spacing layer and those adjacent thereto. Direct transmission measurements become misleading at this stage unless the spectral width of the exploring beam is small relatively to the transmission band of the filter being produced.

The above-described manner of controlling the deposition of the later layers obviates the necessity for control plates separate from the filter, such as have usually been employed hitherto.

On the other hand, the constant presence in the waveform of a component at twice the oscillation frequency makes special demands on the amplifier if the wanted signal, at the oscillation frequency, is not to be distorted, a difficulty which, however, may be eliminated completely by switching the control beam abruptly between two slightly separated wavelengths symmetrically placed with reference to $\lambda_0$; for example, by mounting on the spindle M a scanning disc N of suitable transparent material with an opaque coating $n'$ applied to the face thereof remote from the knife-edge K and scratched as at $n^2$, $n^3$ to provide two concentric half-annular slits (say, 1 mm. wide, which differ in radii by (say) 2 mm. and are diametrically opposed to one another shown in Figs. 3 and 4).

Another method of achieving the same result, which avoids any difficulties due to radial vibration of the scanning disc shaft M, involves removing the opaque coating $n'$ of the disc N so as to leave two half-annular transparent areas $n^4$, $n^5$ which correspond in arrangement to the slits aforesaid but may be up to 1 cm. each in width. In this case the monochromator F has twin entrance slits O (say 1 mm. wide and 2 mm. apart) disposed immediately behind the disc N so as to be uncovered alternately by the areas $n^4$, $n^5$ (Figs. 5 and 6), it being possible to compensate the apparatus for variation in spectral response by adjusting the length or width of these slits O as an alternative to adjustment of the knife-edge K.

When using this alternative system of wavelength modulation, the output from the photocell G is a square wave whose amplitude is determined by the difference in transmitted intensity at the wavelengths represented by the slits $n^2$, $n^3$, such intensity in turn being a measure of the asymmetry of the wavelength-response curve.

Where the apparatus does not require to be adjustable as regards the wavelengths of the filters produced, the monochromator F aforesaid may be replaced by a scanner P built up of two half-circular interference filters $p'$, $p^2$ whose transmitted wavelengths vary by, say, 100 A. and which are arranged edge-to-edge, as shown in Figs. 7 and 8, so that they intersect the exploring beam D alternately during rotation of the scanner.

Alternatively, since the transmitted wavelength of a filter changes when the incident beam is otherwise than normal thereto, the same effect may be obtained by passing the beam D through a single filter Q whose inclination to such beam is varied continuously or abruptly. For example, the filter Q may be mounted upon a glass plate R hingedly mounted at S and having its free edge acted upon by a cam T (Fig. 9) which is designed to produce a uniform oscillatory motion of the plate R as in Fig. 10, or an intermittent motion as in Fig. 11.

Irrespective of the form of scanner employed, the monochromator F is also replaceable by a wedge-section filter whose transmitted wavelength varies longitudinally thereof, and instead of using the projection of a knife-edge K, compensation may be effected by synchronously altering the sensitivity of the electric system.

The improved control method and means above-described has been found capable of reducing the pass-band reproducibility error to not more than ±10 A. at λ6500; that is to say, the pass-bands are located with an accuracy vastly greater than that obtained with any control system hitherto used and sufficient to ensure, in effect, that every filter whose production is so controlled will be usable at its designed wavelength.

We claim:

1. In the production of an interference filter by successive deposition of transparent dielectric layers, a device for controlling layer thickness comprising a source of light, a beam emanating therefrom, a knife edge in the path of said beam, a monochromator intercepting said beam at a point farther from the source than the knife edge, said monochromator being provided with an entrance slit consisting of successive sections of a transparent area arranged on an otherwise opaque disc so that the wave length of the light passing through is different on each section of the area, the axis of the disc being parallel to and spaced apart from the beam, means for rotating said disc about said axis, a filter plate interposed across the beam emanating from said monochromator, means for depositing transparent dielectric material on the filter plate whereby said beam is permitted to pass through said plate, a photoelectric cell intercepting said beam, and means for indicating the intensity of the beam impinging on the cell.

2. In the production of an interference filter by successive deposition of transparent dielectric layers, a device for controlling layer thickness comprising a source of light, a beam emanating therefrom, a knife edge in the path of said beam, a monochromator intercepting said beam at a point farther from the source than the knife edge, said monochromator being provided with an entrance slit consisting of successive sections of a transparent area arranged on an otherwise opaque disc so that the wave length of the light passing through is different on each section of the area, the axis of the disc being parallel to and space apart from the beam, means for rotating said disc about said axis, a vacuum chamber containing means for evaporation of the material forming said dielectric layers and a transparent plate upon which the layers are formed, and means for supporting same, said chamber being provided with transparent walls whereby said beam is permitted to pass through said plate, a photoelectric cell intercepting said beam, and means for indicating the intensity of the beam impinging on the cell.

3. In the production of an interference filter by successive deposition of transparent dielectric layers on a filter plate, a device for controlling layer thickness comprising a source of light, a beam emanating therefrom a knife edge in the path of said beam, a monochromator intercepting said beam at a point farther from the source than the knife edge, said monochromator being provided with an entrance slit consisting of successive sections of an annular transparent area arranged on an otherwise opaque disc so that the wave length of the light passing through is different on each section of the area, the axis of the disc being parallel to and spaced apart from the beam, means for rotating said disc about said axis, means for depositing transparent dielectric material on the filter plate whereby said beam is permitted to pass through said plate, a photo-electric cell intercepting said beam, and means for indicating the intensity of the beam impinging on the cell.

4. A device according to claim 3 wherein the annular transparent area is arranged eccentrically of the disc which intersects the light beam.

5. A device according to claim 3 wherein the successive sections are composed of two half-annular transparent areas, said areas being concentric with the disc, at different distances from its axis and diametrically opposed to each other whereby the wavelength of the light passing through is abruptly varied between certain limits.

6. A device according to claim 5 wherein monochromator is provided with twin entrance slits to which the incident beam is admitted alternately.

References Cited in the file of this patent
UNITED STATES PATENTS

| | | |
|---|---|---|
| 2,166,824 | Runaldue | July 18, 1939 |
| 2,338,234 | Dimmick | Jan. 4, 1944 |
| 2,410,550 | Padva | Nov. 5, 1946 |
| 2,428,990 | Rajchman | Oct. 14, 1947 |
| 2,439,373 | Stearns | Apr. 6, 1948 |
| 2,472,605 | McRae et al. | June 7, 1949 |
| 2,604,528 | Obermaier | July 22, 1952 |
| 2,629,283 | Zobel | Feb. 24, 1953 |
| 2,666,267 | Root | Jan. 19, 1954 |
| 2,725,487 | Butler et al. | Nov. 29, 1955 |
| 2,726,173 | Martin | Dec. 6, 1955 |
| 2,745,773 | Weimer | May 15, 1956 |